United States Patent [19]
Väänänen et al.

[11] Patent Number: 5,942,874
[45] Date of Patent: Aug. 24, 1999

[54] METHOD OF ENSURING STABILITY OF SYNCHRONOUS MACHINE

[75] Inventors: Janne Väänänen, Espoo; Olli Pyrhönen, Lappeenranta, both of Finland

[73] Assignee: ABB Industry Oy, Helsinki, Finland

[21] Appl. No.: 09/094,815

[22] Filed: Jun. 15, 1998

[30] Foreign Application Priority Data

Jun. 13, 1997 [FI] Finland ..................... 972534

[51] Int. Cl.$^6$ ..................... H02P 3/20
[52] U.S. Cl. ............. 318/762; 318/803; 318/764
[58] Field of Search ..................... 318/700–836; 363/132, 41, 137, 35, 37, 51, 124

[56] References Cited

U.S. PATENT DOCUMENTS

| | | | |
|---|---|---|---|
| 3,568,025 | 3/1971 | Havlicek | 318/258 |
| 3,786,331 | 1/1974 | Sommeria et al. | 318/570 |
| 4,088,934 | 5/1978 | D'Atre et al. | |
| 4,652,806 | 3/1987 | Aielo | 318/696 |
| 4,697,131 | 9/1987 | Schauder et al. | 318/762 |
| 4,788,635 | 11/1988 | Heinrich | 363/35 |
| 4,920,306 | 4/1990 | Mard et al. | 318/722 |
| 5,495,160 | 2/1996 | Pond | 318/801 |
| 5,631,819 | 5/1997 | Masaki et al. | 363/132 |

FOREIGN PATENT DOCUMENTS

| | | |
|---|---|---|
| 0702451 | 3/1996 | European Pat. Off. |
| 3826685 | 2/1989 | Germany |

OTHER PUBLICATIONS

"Analysis of Direct Torque Control in Permanent Magnet Synchronous Motor Drives", L. Zhong, M.F. Rahman, W.Y. Hu, and K.W. Kim, IEEE Transactions on Power Electronics, vol. 12, No. 3, May 3, 1997, pp. 528–535.

*Primary Examiner*—Paul Ip
*Attorney, Agent, or Firm*—Watson Cole Grindle Watson P.L.L.C.

[57] ABSTRACT

The invention relates to a method of ensuring the stability of a synchronous machine in controlling the synchronous machine on the basis of direct control of flux and torque, in which the torque generated by the synchronous machine is increased/decreased by increasing/decreasing the instantaneous angular velocity of the stator flux. In accordance with the invention, the method comprises the steps of determining the direction of the stator flux vector ($\psi$s) in rotor coordinates (dq), and forcing the stator flux vector ($\psi$s) to remain in quadrants I and IV (Q1, Q4) of the rotor coordinates by rotating the stator flux in the rotor coordinates to a necessary degree.

8 Claims, 5 Drawing Sheets

METHOD OF ENSURING STABILITY OF SYNCHRONOUS MACHINE

BACKGROUND AND FIELD OF THE INVENTION

The invention relates to a method of ensuring the stability of a synchronous machine in controlling the synchronous machine on the basis of direct control of flux and torque, in which method the torque generated by the synchronous machine is increased/decreased by increasing/decreasing the instantaneous angular velocity of the stator flux. The invention thus relates to ensuring and maintaining the stability of a synchronous machine in controlling the synchronous machine on the basis of direct control of flux and torque, known from e.g. U.S. patent publication 4,918,367, which is incorporated herein by reference. The advantages provided by this control method are excellent dynamics and a very accurate follow-up of the reference value for the torque.

To simplify the presentation, the terms stator flux, or simply flux, are used in the specification below and above when referring to stator flux linkage.

FIG. 1 in the attached drawing shows the rotor coordinates of a synchronous machine, i.e. the dq coordinates. The coordinates are fixed to the rotor reference frame, and the positive direction of the d axis (direct axis) is the magnetizing direction of the excitation current (If). In the above control method the torque acting in a positive direction is increased (decreased) by increasing (decreasing) the instantaneous angular velocity of the stator flux ($\psi$s), whereby the load angle $\delta$ increases (decreases). The positive direction of speed and torque is counter clockwise.

The stability of the control of a synchronous machine can be studied by means of FIG. 2 in the attached drawing, showing the static torque generated by a synchronous machine as a function of the load angle as curve T($\delta$). In studying the stability, a static torque curve is used since it is essential that continuous operation is possible at a certain operating point. At torque reference Tref,1, the operation is stable at point $\delta$1, since an upward swing of the load angle causes the generated torque to exceed the reference value, resulting in a control action which decreases the load angle. Point $\delta$2 is not stable, since a small upward swing of the load angle results in a control action which increases the load angle further. This results in loss of synchronous running. The presented control method does not allow continuous operation if the load angle exceeds the load angle value by which the generated torque reaches its maximum value Tmax. This means that a torque reference Tref,2 exceeding Tmax, does not allow stable operation at all.

DESCRIPTION OF THE PRIOR ART

The above control method can be stabilized in two ways. A conventional stabilizing method is to limit the torque reference such that no situation leads to an unstable operation. This method has two basic problems:

1) Calculating maximum torque Tmax is always uncertain because of errors in the model parameters of the machine and in the stator flux estimate. In addition, the torque estimate calculated by the control system contains error. This is why the maximum allowed value of the torque reference, Tlimit, has to be set below the calculated maximum value Tmax by a sufficient security margin, as can also be seen from FIG. 2.

2) The upper limit Tlimit has to be set so low that the machine in no swing associated with transient phenomena ends up in an unstable operation.

Because of points 1) and 2) the maximum allowed torque reference value Tlimit typically has to be set 20 to 30% lower than the calculated maximum value Tmax. Such an extensive failure to utilize the torque margin considerably shortens the field weakening range. A long field weakening range is a distinct competitive advantage of the use of synchronous machines.

Another way to stabilize is to limit the load angle directly without paying attention to the prevailing torque. This method does not present the above difficulties. Even if the real value of the load angle drifted to an unstable range because of errors while the load angle estimate calculated by the control system still is within a stable range, an avalanche-type increase in the load angle and thereby loss of synchronous running are prevented. For this reason the security margin needed in the method which is based on torque limitation is not needed in limiting the load angle. Load angle limitation is generally used in controlled synchronous machine drives in which the load angle and/or the d and q components ($\psi$sd, $\psi$dq) are the variables to be controlled.

In the control based on direct control of flux and torque, the load angle and the d and p components of the stator flux of the machine are not used as the variables to be controlled, the variables to be controlled being instead the torque and the magnitude of the stator flux (length of space vector).

BRIEF DESCRIPTION OF THE INVENTION

It is an object of the present invention to provide a method of controlling a synchronous machine on the basis of direct control of flux and torque, the method not involving the shortcomings of the type described above and related to the limitation of the maximum torque reference. This is achieved by the method of the invention, which is characterized by comprising the steps of determining the direction of the stator flux vector in rotor coordinates and forcing the stator flux vector to remain in quadrants I and IV of the rotor coordinates by rotating the stator flux in the rotor coordinates to a necessary degree.

The direction of the stator flux in the rotor coordinates can be determined by a coordinate transformation by using as starting points the perpendicular (x and y) components given in the stator coordinates of the stator flux and being known variables in the control which is based on direct control of flux and torque.

The stator flux vector is preferably forced to remain in the desired quadrants in such a manner that when the determined stator flux vector is located in quadrant II of the rotor coordinates, the stator flux is rotated clockwise in the rotor coordinates until the stator flux vector has moved to quadrant I, and when the determined stator flux vector is located in quadrant III of the rotor coordinates, the stator flux is rotated counter clockwise in the rotor coordinates until the stator flux vector has moved to quadrant IV.

The stator flux is preferably rotated in the desired direction by rotating it clockwise in the rotor coordinates by giving the torque control a negative torque reference, and the stator flux is rotated counter clockwise in the rotor coordinates by giving the torque control a positive torque reference. In this case the positive and negative torque references can either have constant absolute values or be dependent on the angle of the determined stator flux vector, i.e. the load angle, or some other variable associated therewith, such as a trigonometric function of the load angle or the like.

It is further preferable that when the determined stator flux vector is located within a predetermined area, located in quadrant I or IV, respectively, and being limited to the boundary between quadrant I and II, or similarly the border between quadrant III and IV, the torque reference of the torque control is limited as a function of the stator flux vector in such a way that the closer the boundary between quadrant I and II or quadrant III and IV, respectively, the smaller the torque reference. The torque reference is preferably limited in such a way that when the determined stator flux vector is located at the boundary between quadrant I and II or quadrant III and IV, respectively, the torque reference is zero.

BRIEF DESCRIPTION OF THE FIGURES

In the following the invention will be described with reference to the attached drawing, in which.

DETAILED DESCRIPTION OF THE INVENTION

Figure 1:
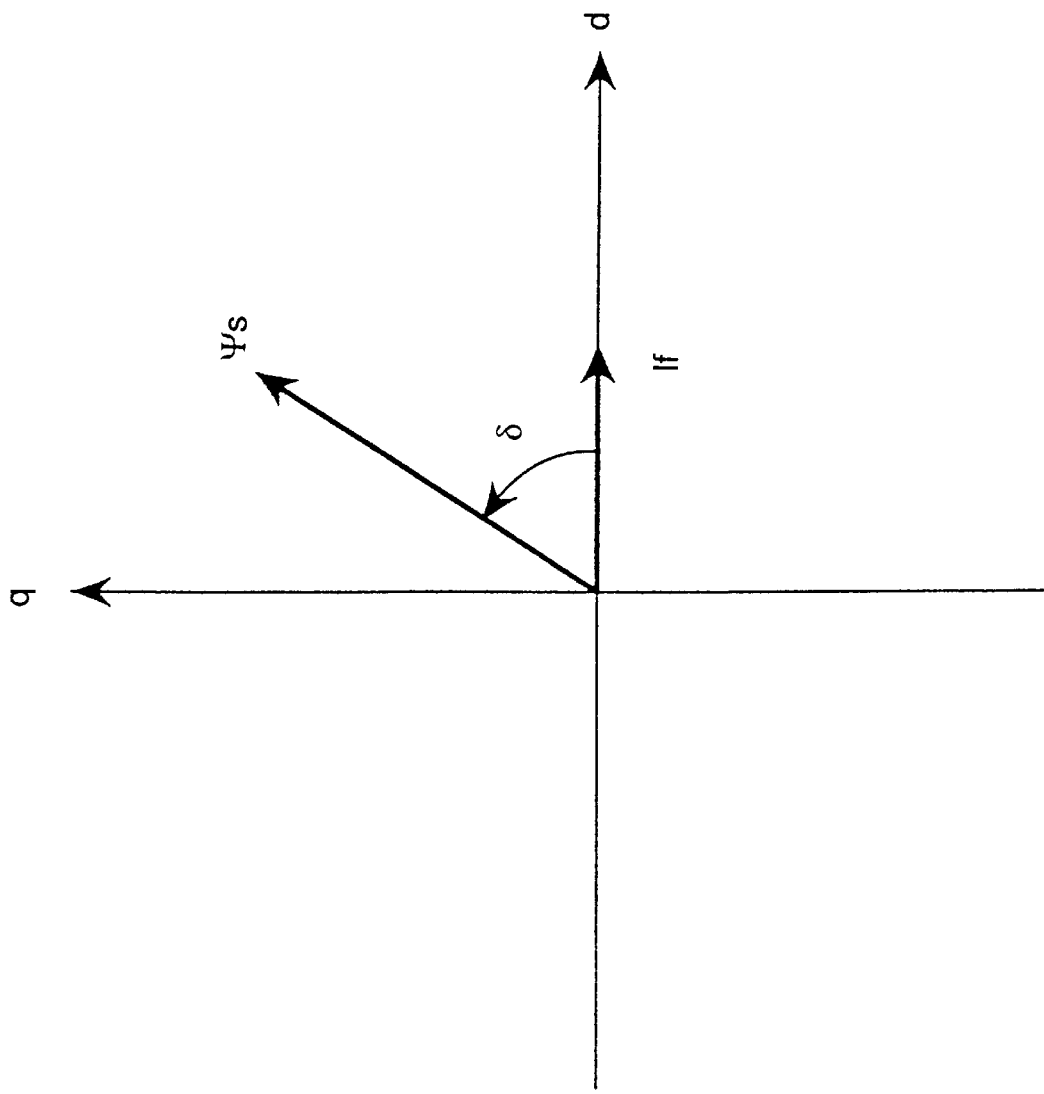
FIG. 1 shows a stator flux vector in the rotor coordinates of a synchronous machine, i.e. the dq coordinates.
Figure 2:
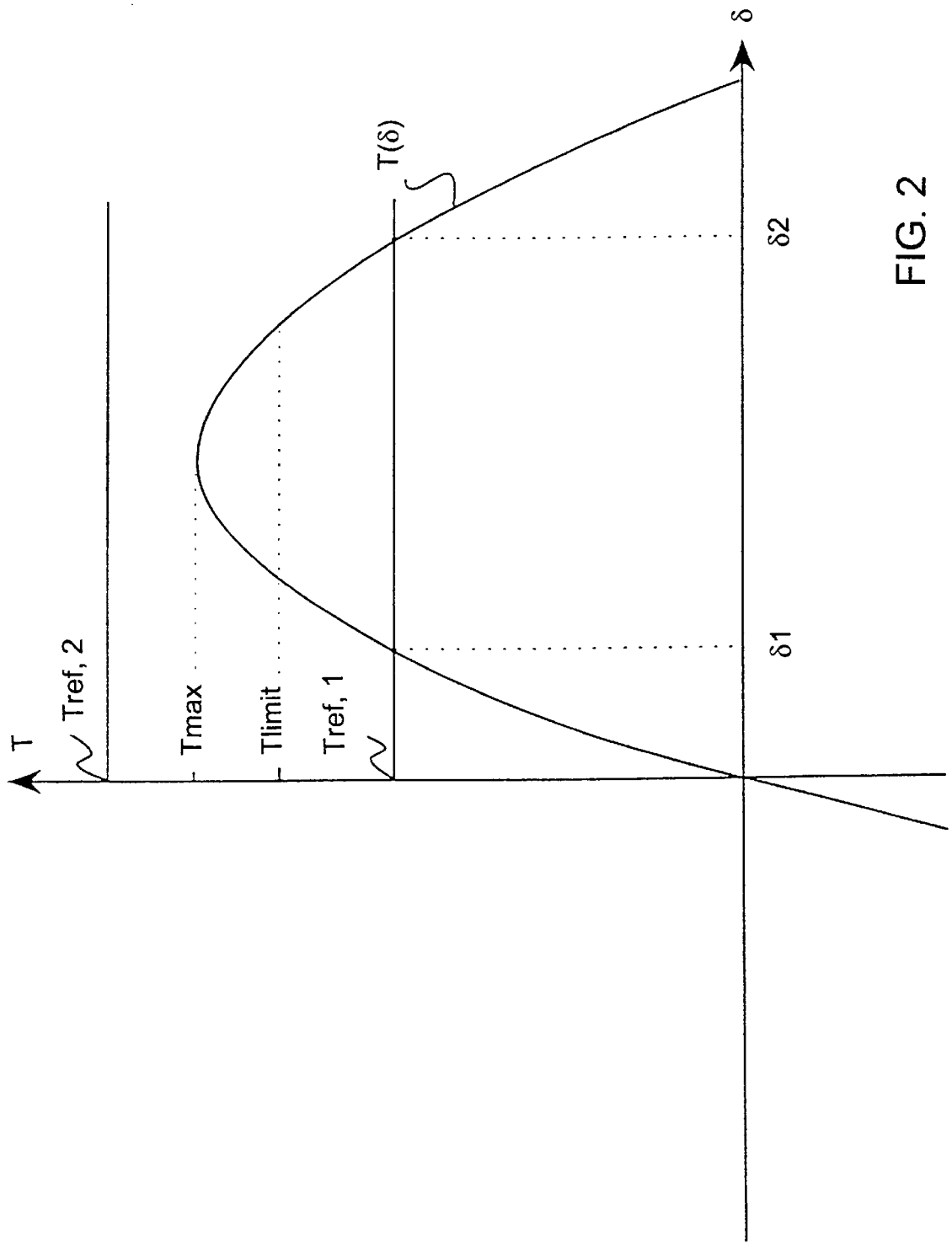
FIG. 2 shows a static torque generated by a synchronous machine as a function of the load angle.
Figure 3:
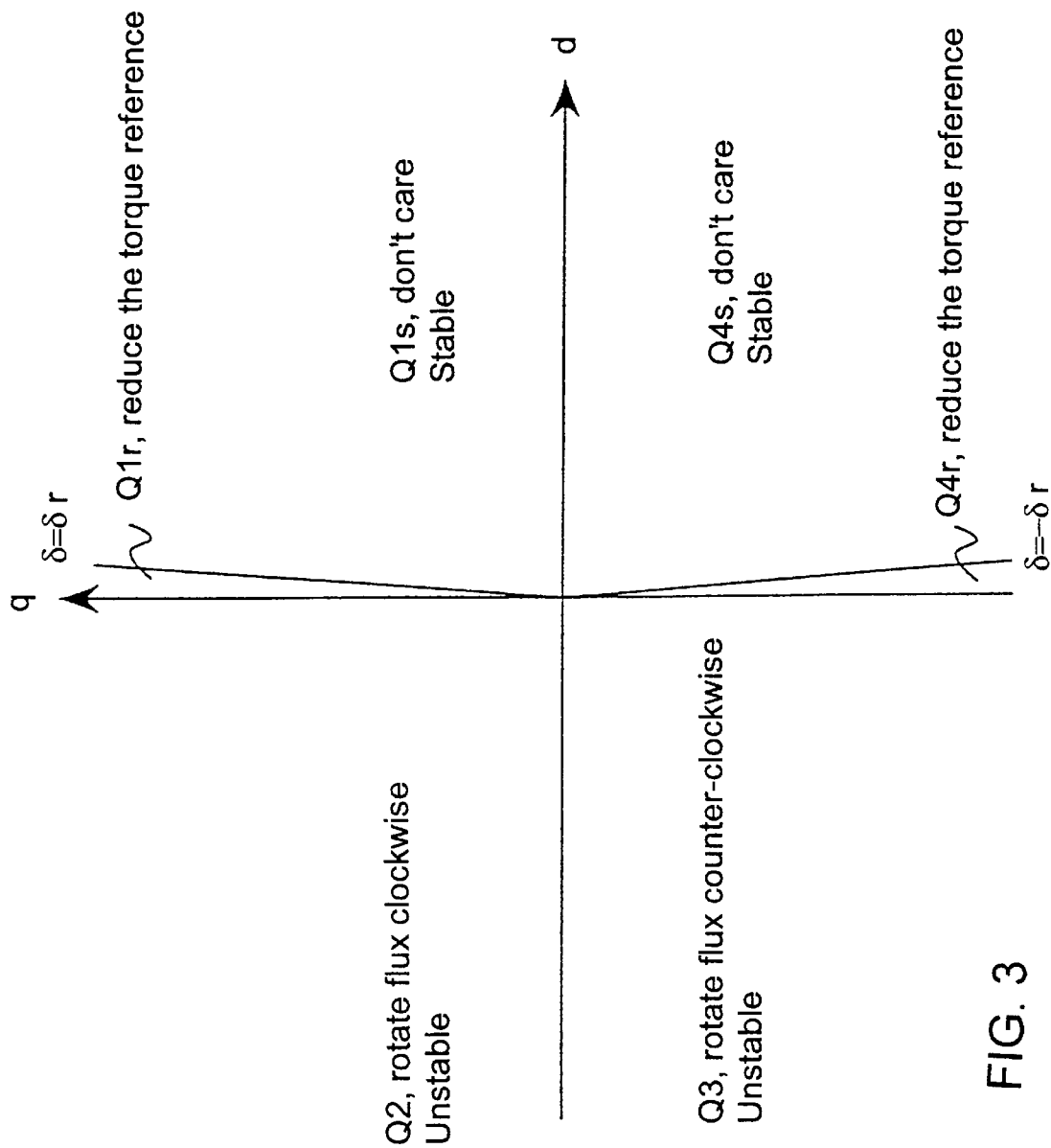
FIG. 3 shows the quadrants of rotor coordinates and torque reference limitation ranges therein.

In the method of the invention, the stability of a synchronous machine is ensured and maintained by a control system which is based on direct control of flux and torque by forcing the stator flux to remain in the first or fourth quadrant (Q1 and Q4) of the dq coordinates, i.e. the rotor coordinates, i.e. by limiting the load angle of the machine to these quadrants. This basic idea is illustrated in FIG. 3, in which quadrants Q1 and Q4 are marked as allowed ranges and quadrants Q2 and Q3 as forbidden ranges. If a shift occurs to the second quadrant Q2, the stator flux is rotated clockwise in the rotor coordinates until quadrant Q1, i.e. an allowed range, is reached. If a shift occurs to quadrant Q3, the stator flux is rotated counter clockwise in the rotor coordinates, until quadrant Q4 is reached.

Rotating or turning the stator flux clockwise can be implemented e.g. by a negative torque reference and, correspondingly, rotation counter clockwise by a positive torque reference. The magnitude of the torque reference can be constant or a function of the load angle.

If the load angle limitation is carried out too seldom, i.e. at a too long execution interval, the generated torque oscillates intensively when the load angle limit, i.e. quadrant limit Q1–Q2 or Q4–Q3, is reached. If the load angle can be limited at very short execution intervals (e.g. 25 $\mu$s), the above problem is avoided.

Figure 4:
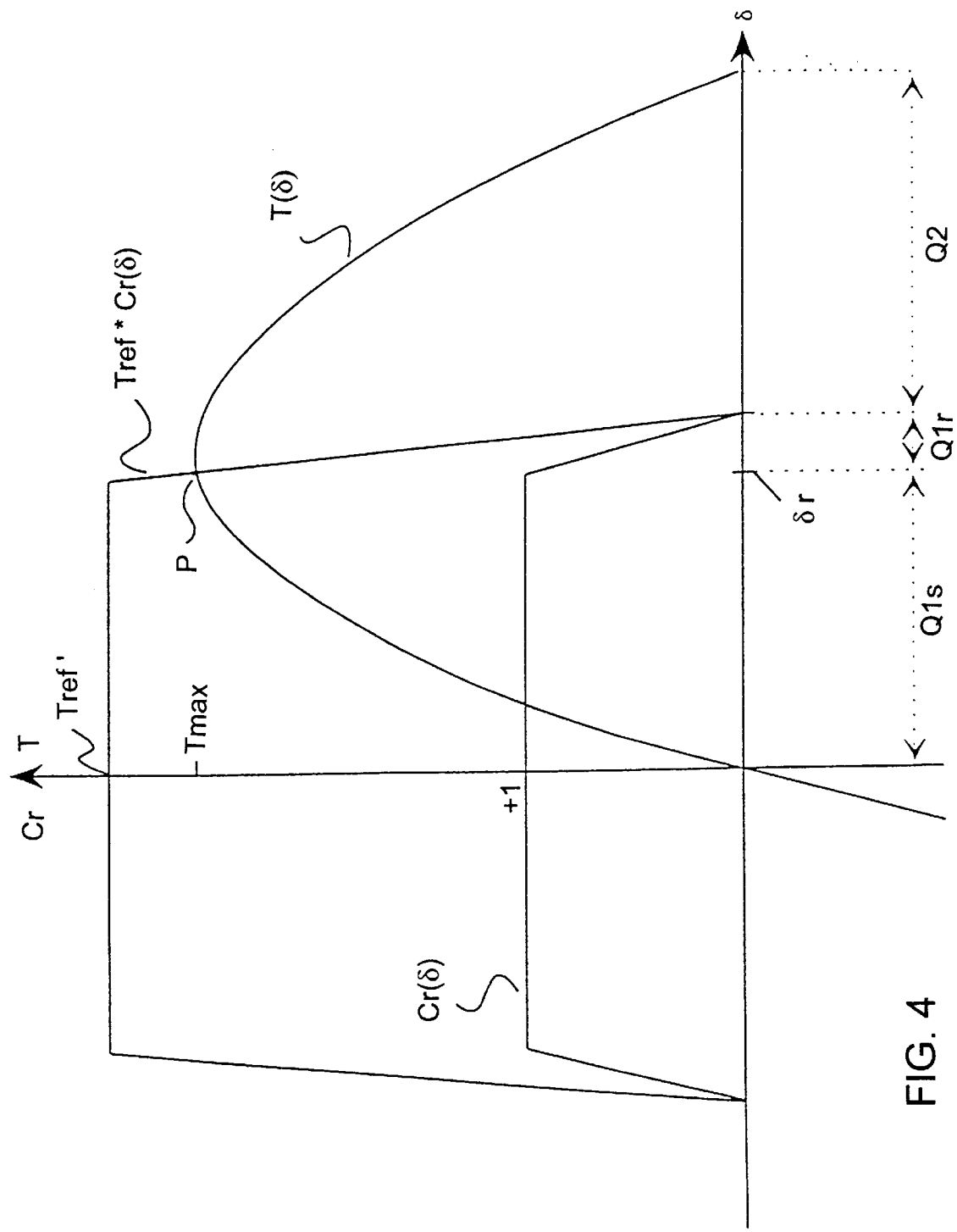
FIG. 4 shows an example of limiting the torque reference by a window function.

Torque oscillation can be reduced by limiting the torque reference value when approaching the load angle limit, i.e. when reaching the ranges Q1r and Q4r of quadrants Q1 and Q4, respectively, limited by the load angle limits Q1–Q2 and Q3–Q4, respectively. In this case the remaining ranges of quadrants I and IV, in which the torque reference does not have to be limited, are denoted by Q1s and Q4s. Within ranges Q1r and Q4r, respectively, the load angle $\delta \geq \delta r$ or $\delta \leq -\delta r$, respectively. The torque reference can be reduced by e.g. the method shown in FIG. 4 by multiplying the torque reference by a window function Cr, which decreases the torque reference to zero when moving from the boundary of range Q1r and Q4r, respectively, to the boundary Q1–Q2 and Q3–Q4 between the quadrants. FIG. 4 only shows the situation as regards the boundary between quadrants Q1 and Q2. A stable operating point is found at point P, in which said curve formed by the torque reference and the window function intersects the static torque curve of the synchronous machine.

Limiting the torque reference value, i.e. using torque reduction, decreases the maximum torque to be utilized, but in practice the reduction is not significant. For example with a cylindrical rotor synchronous machine the maximum torque is achieved at the load angle value $\delta=90°$. In this case starting torque reduction at the load angle $\delta r=80°$ reduces the maximum torque to be utilized at most by the coefficient $\sin(80°)/\sin(90°)=0.985$, i.e. about 1.5%.

The required extension of the torque reduction range, i.e. the slope of the torque reference curve, depends on the allowed torque waviness when operating at the load angle boundary and on the execution interval at which the load angle limitation is implemented.

Figure 5:
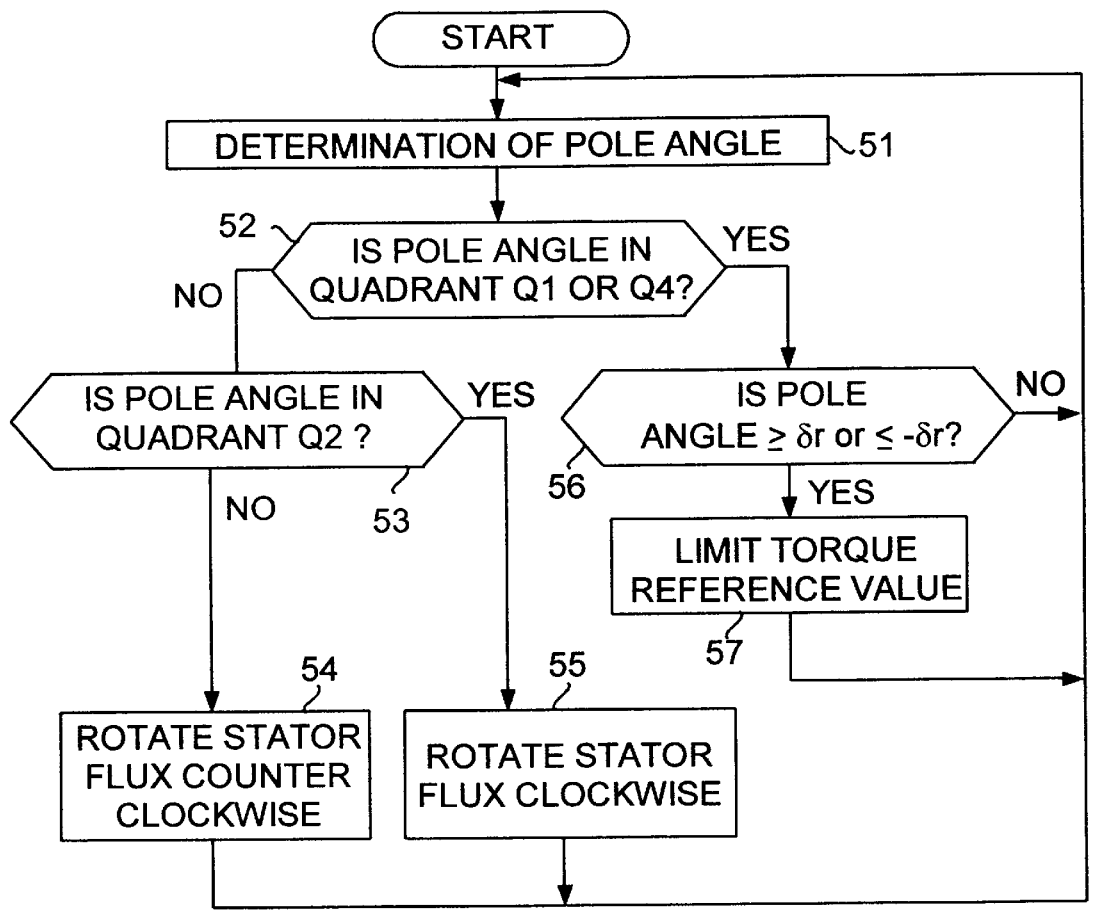
FIG. 5 shows a flow diagram of the steps associated with the implementation of the method according to the invention.

FIG. 5 illustrates the method of the invention by means of a flow diagram. In the figure, reference 51 denotes the step in which the load angle, i.e. the direction of the stator flux in the rotor coordinates, i.e. the dq coordinates, is determined. After load angle determination, the next step is 52 in which a test is made to see if the load angle is in quadrants Q1 or Q4. If not, step 53 is taken to test if the load angle is in quadrant Q2. If so, the stator flux is rotated clockwise in the rotor coordinates in block 55 to make it move to quadrant Q1. The accomplishment of this rotation has been described above. If in step 53 the stator flux is not found to be in quadrant Q2, it has to be in quadrant Q3, whereby the stator flux is rotated in block 54 counter clockwise in the rotor coordinates to force it to quadrant Q4. From blocks 54 and 55 the process moves to block 51 to redefine the load angle.

If the load angle was found above in block 52 to be in quadrants Q1 or Q4, an additional test is made in block 56 to see if the load angle is in ranges Q1r or Q4r illustrated in FIGS. 3 and 4. If so, the torque reference value is limited in block 57, as was described in association with FIG. 4. From block 57 and similarly from block 56 the process returns to block 51 to redefine the load angle if it is not in ranges Q1r or Q4r.

In the method of the invention the stator flux can be replaced by a air gap flux ($\psi m$) or a damper winding flux ($\psi_D + j\psi_Q$). Functions having as argument the load angle $\delta$, can be replaced by a function having as arguments $\cos(\delta) = \psi sd/\psi s$, $\sin(\delta) = \psi sq/\psi s$ or other corresponding form by which the necessary interdependencies are achieved.

It is obvious to a person skilled in the art that the invention and its embodiments are thus not limited to the above described examples, but may vary within the scope of the attached claims.

We claim:

1. A method of ensuring the stability of a synchronous machine in controlling the synchronous machine on the basis of direct control of flux and torque, in which the torque generated by the synchronous machine is increased/decreased by increasing/decreasing an instantaneous angular velocity of a stator flux vector, the method comprising the steps of;

determining the direction of the stator flux vector ($\psi$s) in rotor coordinates (dq), and forcing the stator flux vector ($\psi$s) to remain in quadrants I and IV (Q1, Q4) of the rotor coordinates by rotating the stator flux in the rotor coordinates to a necessary degree.

2. A method as claimed in claim 1, wherein rotating the stator flux ($\psi$s) in the rotor coordinates comprises controlling the angular velocity and direction of the stator flux measured in the stator coordinates.

3. A method as claimed in claim 2, wherein, when the determined stator flux vector is located in a predetermined range (Q1r, Q2r) which is located in quadrant I (Q1) or IV (Q4), respectively, and limited to the boundary (Q1–Q2) between quadrants I and II or the boundary (Q3–Q4) between quadrants III and IV, respectively, the torque reference of the torque control is limited as a function of the direction of the stator flux vector ($\psi$s) such that the closer the stator flux vector is to the boundary between quadrants I and II and quadrants III and IV, respectively, the smaller is the torque reference.

4. A method as claimed in claim 3, wherein, when the determined stator flux vector is located at the boundary (Q1–Q2; Q3–Q4) of quadrants I and II or quadrants III and IV, respectively, the torque reference is zero.

5. A method as claimed in claim 1, wherein, when the determined stator flux vector ($\psi$s) is located in quadrant II (Q2) of the rotor coordinates, the stator flux is rotated clockwise in the rotor coordinates until the stator flux vector has moved to quadrant I (Q1), and when the determined stator flux vector ($\psi$s) is located in quadrant III (Q3) of the rotor coordinates, the stator flux is rotated counter clockwise in the rotor coordinates until the stator flux vector has moved to quadrant IV (Q4).

6. A method as claimed in claim 5, wherein rotating the stator flux ($\psi$s) clockwise in the rotor coordinates comprises giving the torque control a negative torque reference, and rotating the stator flux counter clockwise in the rotor coordinates comprises giving the torque control a positive torque reference.

7. A method as claimed in claim 6, wherein said positive and negative torque references have a constant absolute value.

8. A method as claimed in claim 6, wherein said positive and negative torque references have an absolute value which depends on the angle, i.e. the load angle ($\delta$), of the determined stator flux vector, or some other variable related thereto, such as tan ($\delta$) or the like.

* * * * *